July 10, 1928. 1,676,945

L. V. ELLIS

DRY CELL BATTERY

Filed Jan. 5, 1928

INVENTOR
Lawrence Victor Ellis
BY
ATTORNEY

Patented July 10, 1928.

1,676,945

UNITED STATES PATENT OFFICE.

LAURENCE VICTOR ELLIS, OF NEW YORK, N. Y.

DRY-CELL BATTERY.

Application filed January 5, 1928. Serial No. 244,618.

This invention relates generally to the cells of dry batteries, and has more particular reference to a refillable battery cell.

The invention has for an object the provision of a refillable battery cell of efficient and reliable construction. The life of the cell, of course, depends upon the frequency to which the battery is used. A battery constructed with the invention cells, is adapted for any open circuit work. It may be made in any size to fit the purpose for which it is intended, such as for marine, stationary or auto ignition work, bell and elevator signals, etc.

Other factors tending to deteriorate the cells of a battery, necessitating the replacement thereof are the keeping of the battery in either extreme cold or hot places, or where there is much vibration. Any of these causes will crack the pitch sealing used to exclude air from the cells, thereby allowing the moisture of the electrolyte to evaporate, rendering the cell useless.

Since chloride of ammonia (sal ammoniac) is the basic or active chemical electrolyte of the dry cell battery, and as this chemical may be purchased at a nominal price throughout the civilized world wherever batteries are used, hence, the advantages of a refillable dry cell are obvious.

For further comprehension of the invention and of the objects and advantages thereof, reference will be had to the following description and accompanying drawings, and to the appended claims in which the various novel features of the invention are more particularly set forth.

Referring to the accompanying drawing, forming a material part of this disclosure:

Figure 1:
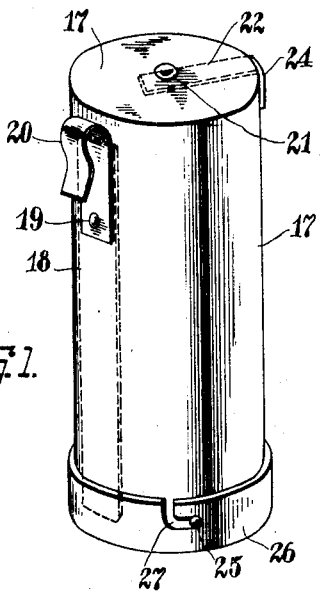
Fig. 1 is a perspective view of a battery cell constructed according to this invention.
Figure 2:
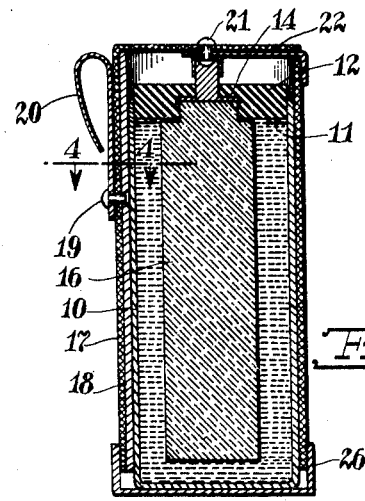
Fig. 2 is a central vertical sectional view thereof.

The reference numeral 10 indicates a zinc cup provided with a shoulder 11 near its upper end. A rubber stopper 12 is forced into the top of the cup so that the bottom rests on the shoulder 11. A rod 13 with a bottom cup 14 connected therewith is disposed through the center of stopper 12, and the reduced portion 15 of a carbon post 16 engages in the bottom cup 14. The spaces between the carbon post 16 and the cup 10 are filled with electrolyte.

A fibre casing 17 is engaged over the zinc cup 10 and the casing is provided with a side contact strip 18 which connects with the side of the zinc cup. The side contact strip 18 is held against displacement by rivet 19, which connects with an outside contact 20. A rivet 21 supports a contact strip 22 and a cup 23 to the top of the casing 17. The strip 22 projects through the casing and has a downturned end 24 and the cup 23 connects with rod 13. The casing 17 is provided with a projecting pin 25 near its lower end and a bottom cover 26 engages over the bottom of the casing, and has a bayonet slot 27 engaging the pin 25, which serves to hold the cover in place.

Figure 5:
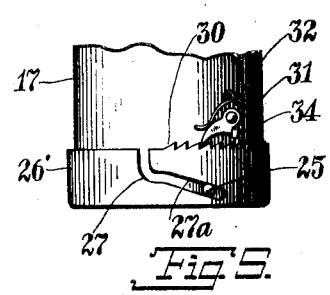
Fig. 5 is a fragmentary front view of Fig. 1 but illustrating a modified form of the invention.
Figure 6:
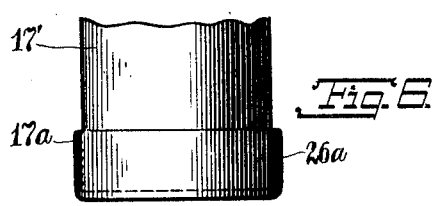
Fig. 6 is a fragmentary front view of Fig. 1 but illustrating another modified form of the invention.

Fig. 5 discloses the casing 17 provided with the projecting pin 25 engaged in a cam slot 27ª which is a continuation of bayonet slot 27 of the bottom cover 26'. The top edge of the bottom cover 26' has ratchet teeth 30 engaged by a pawl 31 pivotally arranged on the side of casing 17 and pressed into engagement by spring 32. A stop 34 projects from the casing 17 and engages beneath pawl 31. Turning the cover 26' towards the left serves to force the cover upwards and presses the zinc cup 10 upwards so that rod 13 connects with cup 23. Fig. 6 discloses another modification in which casing 17' is provided with threads 17ª and the bottom cover 26ª is threadedly engaged on these threads.

Figure 3:
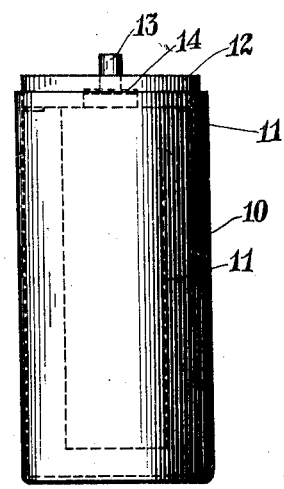
Fig. 3 is a side view of the cell without its casing.
Figure 4:
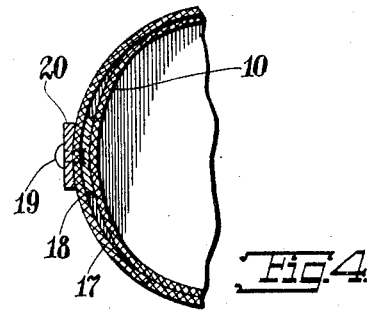
Fig. 4 is a fragmentary horizontal sectional view, taken on the line 4—4 of Fig. 2.

The operation of the device consists in removing the bottom cover then removing the zinc cup, complete as shown in Fig. 3, from the casing. Next the stopper 12 is removed and the electrolyte replaced. Upon reassembling the various parts, the cell is again ready for use.

While I have illustrated and described the preferred form, construction and arrangement of the several elements employed, it will be understood that the device is nevertheless, susceptible of considerable modification therein, and I therefore reserve the right and privilege of resorting to all such changes as may be fairly embodied within the spirit and scope of the invention as claimed.

Having thus described my invention, what I claim as new and desire to secure by United States Letters Patent is:

1. A refillable cell for a dry battery, comprising a zinc cup provided with a shoulder near its upper end, a rubber stopper forced into the top of the cup and against the shoulder, a rod with a bottom cup disposed through the center of the stopper, a carbon post with a reduced portion engaged in said bottom cup, eletrolyte in the space between the carbon post and the zinc cup, a casing over said zinc cup, a contact strip on the inside of the casing and engaging the zinc cup, a contact on the outside of he casing connected with the contact strip by means of a rivet, a contact strip in the top of the casing, and projecting therefrom, a cup adjacent the contact strip, a rivet holding the latter cup and contact strip to the top of the casing, the said rod, disposed in the stopper engaged in the latter mentioned cup, and a bottom cover for the casing.

2. A refillable cell for a dry battery comprising a zinc cup, a rubber stopper forced into the top of the cup, a rod with a bottom cup disposed through the center of the stopper, a carbon post with a reduced portion engaged in said bottom cup, electrolyte in the space between the carbon post and the zinc cup, a casing over said zinc cup, a contact strip on the inside of the casing, and engaging the zinc cup, a contact on the outside of the casing connected with the contact strip by means of a rivet, a contact strip in the top of the casing and projecting therefrom, a cup adjacent the contact strip, a rivet holding the latter cup and contact strip to the top of the casing, the said rod disposed in the stopper, engaged in the latter mentioned cup, and a bottom cover for the casing.

3. A refillable cell for a dry battery, comprising a zinc cup provided with a shoulder near its upper end, a rubber stopper forced into the top of the cup and against the shoulder, a rod disposed through the center of the stopper, a carbon post with a reduced portion connected to the rod, electrolyte in the space between the carbon post and the zinc cup, a casing over said zinc cup, a contact strip on the inside of the casing, and engaging the zinc cup, a contact on the outside of the casing connected with the contact strip by means of a rivet, a contact strip in the top of the casing and projecting therefrom, a cup adjacent the contact strip, a rivet holding the latter cup and contact strip to the top of the casing, the said rod disposed in the stopper, engaged in the latter mentioned cup, and a bottom cover for the casing.

4. A refillable cell for a dry battery, comprising a zinc cup provided with a shoulder near its upper end, a rubber stopper forced into the top of the cup and against the shoulder, a rod disposed through the center of the stopper, a carbon post connected to the rod, electrolyte in the space between the carbon post and the zinc cup, a casing over said zinc cup, a contact strip on the inside of the casing, and engaging the zinc cup, a contact on the outside of the casing connected with the contact strip by means of a rivet, a contact strip in the top of the casing and projecting therefrom, a cup adjacent the contact strip, a rivet holding the latter cup and contact strip to the top of the casing, the said rod disposed in the stopper, engaged in the latter mentioned cup, and a bottom cover for the casing.

5. A refillable cell for a dry battery, comprising a zinc cup provided with a shoulder near its upper end, a rubber stopper forced into the top of the cup and against the shoulder, a rod with a bottom cup disposed through the center of the stopper, a carbon post with a reduced portion engaged in said bottom cup, electrolyte in the space between the carbon post and the zinc cup, a casing over said zinc cup, a contact strip on the inside of the casing, and engaging the zinc cup, a contact on the outside of the casing connected with the contact strip, a contact strip in the top of the casing, and projecting therefrom, a cup adjacent the contact strip, a rivet holding the latter cup and contact strip to the top of the casing, the said rod disposed in the stopper, engaged in the latter mentioned cup, and a bottom cover for the casing.

6. A refillable cell for a dry battery, comprising a zinc cup provided with a shoulder near its upper end, a rubber stopper forced into the top of the cup, and against the shoulder, a rod with a bottom cup disposed through the center of the stopper, a carbon post with a reduced portion engaged in said bottom cup, electrolyte in the space between the carbon post and the zinc cup, a casing over said zinc cup, a contact strip on the inside of the casing, and engaging the zinc cup, a contact on the outside of the casing connected with the contact strip by means of a rivet, a contact strip in the top of the casing and projecting therefrom, a cup adjacent the contact strip, a rivet holding the latter cup and contact strip to the top of the casing, the said rod disposed in the stopper engaged in the latter mentioned cup, and a bottom cover for the casing removably connected therewith.

7. In combination with a zinc battery cell having an upper contact connected to the carbon post thereof, a casing engaged over the cell, a side strip within the casing engaging the zinc portion of the cell, an outer contact connected with the side strip, a top contact strip projecting from the casing, a cup adjacent the top contact strip, a rivet holding the cup and top contact strip in place, a bottom cover on the casing, and engaging the bottom of the cell, the said bottom cover being formed with a bayonet slot, and a pin projecting from the cover, engaged within the bayonet slot.

8. In combination with a zinc battery cell having an upper contact connected to the carbon post thereof, a casing engaged over the cell, a side strip within the casing engaging the zinc portion of the cell, an outer contact connected with the side strip, a top contact strip projecting from the casing, a cup adjacent the top contact strip, a rivet holding the cup and top contact strip in place, a bottom cover on the casing, and engaging the bottom of the cell, the said bottom cover being formed with a bayonet slot, and a cam slot continued from the bayonet slot, a pin projecting from the cover being engaged in the cam slot, rack teeth on the top edge of the cover, and a spring pressed pawl supported from the casing and engaging the rack teeth.

In testimony whereof I have affixed my signature.

LAURENCE VICTOR ELLIS.